US007007764B2

(12) United States Patent
Smith et al.

(10) Patent No.: US 7,007,764 B2
(45) Date of Patent: Mar. 7, 2006

(54) CARBODY TO CRAWLER CONNECTION

(75) Inventors: Harley Smith, Sheboygne, WI (US); Joel Zick, Manitowoc, WI (US)

(73) Assignee: Manitowoc Crane Companies, Inc., Reno, NV (US)

( * ) Notice: Subject to any disclaimer, the term of this patent is extended or adjusted under 35 U.S.C. 154(b) by 88 days.

(21) Appl. No.: 10/313,266

(22) Filed: Dec. 6, 2002

(65) Prior Publication Data

US 2004/0108292 A1 Jun. 10, 2004

(51) Int. Cl.
*B62D 55/084* (2006.01)

(52) U.S. Cl. .......................................................... 180/9.1

(58) Field of Classification Search ................. 180/9.1, 180/9.21, 9.26, 9.42, 9.52, 9.48
See application file for complete search history.

(56) References Cited

U.S. PATENT DOCUMENTS

| | | | | |
|---|---|---|---|---|
| 1,705,578 A | | 3/1929 | Lichtenberg | |
| 2,375,264 A | | 5/1945 | Wagner et al. | |
| 2,711,907 A | | 6/1955 | Lundquist et al. | |
| 3,036,650 A | | 5/1962 | Cimino | |
| 3,037,571 A | * | 6/1962 | Zelle | 180/9.48 |
| 3,163,249 A | | 12/1964 | Ledohowski | |
| 3,313,368 A | * | 4/1967 | Carter et al. | 180/9.1 |
| 3,712,398 A | | 1/1973 | Althaus | |
| 3,757,881 A | | 9/1973 | Short et al. | |
| 3,872,939 A | * | 3/1975 | Eckert | 180/6.48 |
| 3,894,596 A | | 7/1975 | Muller | |
| 3,899,038 A | | 8/1975 | Griffith et al. | |
| 3,976,153 A | | 8/1976 | Lateur | |
| 3,998,286 A | | 12/1976 | Ponikelsky et al. | |
| 4,000,784 A | | 1/1977 | Morrow, Sr. et al. | |
| 4,014,400 A | * | 3/1977 | Cline et al. | 180/9.1 |
| 4,195,740 A | | 4/1980 | Beduhn et al. | |
| 4,266,679 A | | 5/1981 | Juergens | |
| 4,341,276 A | | 7/1982 | Furuichi | |
| 4,454,952 A | | 6/1984 | McGhie | |
| 4,469,186 A | | 9/1984 | Goodwine | |
| 4,625,820 A | | 12/1986 | Christian | |
| 4,640,421 A | | 2/1987 | Mason | |
| 5,823,279 A | | 10/1998 | Petzold | |
| 6,158,535 A | * | 12/2000 | Porubcansky et al. | 180/9.1 |

FOREIGN PATENT DOCUMENTS

| | | |
|---|---|---|
| CA | 1160252 | 1/1984 |
| DE | 1458280 | 12/1976 |
| DE | 3725920 A1 | 2/1989 |
| FR | 2255252 | 7/1975 |
| FR | 2450191 | 9/1980 |

(Continued)

OTHER PUBLICATIONS

Manitowoc Model 4100W Brochure, published by Manitowoc Company, 1972, 8 pages.

(Continued)

*Primary Examiner*—Lesley D. Morris
*Assistant Examiner*—Paul Royal, Jr.
(74) *Attorney, Agent, or Firm*—Brinks Hofer Gilson & Lione

(57) ABSTRACT

A crawler vehicle having a lower works comprising a carbody and a pair of crawler assemblies. Each of the crawler assemblies are removably connected to the carbody by a plurality of carbody to crawler connections. The carbody to crawler connection each comprise at least one keyway for aligning the connection components of the crawler assembly with the connection components of the carbody, and for preventing these connection components from becoming misaligned in response to eccentric forces or deflections generated between the carbody and each of the crawler assemblies.

14 Claims, 6 Drawing Sheets

FOREIGN PATENT DOCUMENTS

| | | |
|---|---|---|
| GB | 1458280 | 12/1976 |
| NL | 7804546 | 4/1978 |

OTHER PUBLICATIONS

Manitowoc Model 4100 Brochure, 2 pages.

Manitowoc M-Series Brochure, published by Manitowoc Company, 10 pages.

Manitowoc M-50W Brochure, published by Manitowoc Company, 1989, 6 pages.

Manitowoc M-65W Brochure, published by Manitowoc Company, 1990, 6 pages.

Manitowoc M-80W Brochure, published by Manitowoc Company, 1989, 6 pages.

Mannesmann Demac Brochure, 11 pages.

European Search Report dated Dec. 12, 2004.

* cited by examiner

CARBODY TO CRAWLER CONNECTION

BACKGROUND OF THE INVENTION

The present invention relates to construction equipment, such as crawler cranes, which must be disassembled into a number of components to be transported between job sites. In particular, the present invention relates to a removable connection for connecting each of the crawlers to the carbody of the crawler crane. The present invention also relates to a method of connecting (and disconnecting) each of the crawlers to (from) the carbody of the crane.

Construction equipment, such as cranes or excavators, often must be moved from one job site to another. Moving a crane or an excavator can be a formidable task when the machine is large and heavy. For example, highway limits on vehicle-axle loads must be observed and overhead obstacles can dictate long, inconvenient routings to the job site.

One solution to improving the mobility of large construction machines, such as cranes, is to disassemble them into smaller, more easily handled components. The separate components can then be transported to the new job site where they are reassembled. For example, the typical practice has been to disconnect, remove, and transport the crawlers separately from the crane.

In conventional cranes, each of the crawlers is typically bolted to the carbody of the crane. Because the connections between the crawlers and the crane carbody must sustain tremendous loads, the size and number of bolts used in these connections can be substantial. Accordingly, removing each of the crawlers from the carbody of the crane usually requires the loosening and removal of numerous large bolts from each of the crawler to carbody connections. Once the crane components are delivered to the new job site, then the crawlers must be carefully aligned with the carbody, and each of the bolts must then be re-inserted and tightened for each of the crawler to carbody connections. As a consequence, the disconnection and re-connection of the crawlers to the crane can be a difficult and time-consuming process.

One attempt to overcome some of the above-described problems is disclosed in U.S. Pat. No. 5,823,279 to Petzold, entitled "Carbody to Crawler Connection", which issued Oct. 20, 1998. This patent discloses a carbody to crawler connection that utilizes a pair of pins. A vertical pin extends upwardly from the horizontal flange on the top of the carbody arm and is configured to loosely engage a hole in the horizontal flange on the top of the crawler frame weldment. A horizontal pin passes through lower portions of the vertical flanges of the carbody arm and the vertical flange of the crawler frame weldment. The crawler is attached to the carbody by first placing the hole in the horizontal flange on the top of the crawler frame weldment over the vertical pin on the top of the carbody arm. The hole in the vertical flange of the crawler frame weldment is then aligned with the holes in the vertical flanges of the carbody arm. The horizontal pin is then inserted through these holes so as to complete the connection.

The carbody to crawler connection disclosed in U.S. Pat. No. 5,823,279 has several advantages over the bolted-type connections typically used in conventional cranes. For example, this type of connection eliminates the need to carefully align and fasten numerous bolts. However, this type of connection is not suitable for larger cranes. In particular, the forces generated between the carbody to crawler connection in larger cranes can cause the connection components to deflect and become misaligned with respect to each other. For example, the arms of the carbody may twist or spread outwardly as a result of eccentricities in the forces between the carbody and the crawlers. The carbody to crawler connection may even fail if the deflection and misalignment in these components is large enough.

The degree of deflection and misalignment can be further aggravated by the use of high strength steel, which is often used for larger cranes. This is because high strength steel has the same modulus of elasticity as lower strength steel. As a result, the higher loads that components using high strength steel are designed to accommodate will necessarily cause higher deflections.

To prevent the deflection and misalignment of the carbody to crawler connection components in larger cranes, the arms one each side of the carbody have been typically connected together so as to form a box-like structure. However, the use of plates or cross-bracing between the carbody arms can add significant weight and manufacturing costs to the crane. Plates or cross-bracing between the carbody arms can also inhibit access to portions of the crane, and can make the disconnection and re-connection of the crawlers to the crane more difficult.

It is therefore desirable to provide an improved carbody to crawler connection that facilitates a simple and time-efficient disconnection and re-connection of the crawlers to the crane, that will not deflect or become misaligned as a result of forces generated between the carbody to crawler connection components, and does not require the use of plate structures or cross-bracing between the carbody arms.

BRIEF SUMMARY OF THE INVENTION

In preferred aspects, the present invention comprises a crane having an upper works rotatably mounted on a lower works, a boom pivotally mounted on the upper works, a mast pivotally mounted on the upper works and pendantly connected to the boom, and boom hoist rigging connected to the mast for controlling the angle of the boom. The lower works comprises a carbody and a pair of removably connected crawler assemblies.

The invention further comprises a plurality of carbody to crawler connections for removably connecting each of the crawler assemblies to the carbody. The carbody to crawler connection comprises at least one keyway for aligning the connection components of the crawler assembly with the connection components of the carbody, and for preventing these connection components from becoming misaligned in response to eccentric forces or deflections generated between the carbody and the crawler assemblies.

These and other advantages, as well as the invention itself, will become apparent in the details of construction and operation as more fully described and claimed below. Moreover, it should be appreciated that several aspects of the invention can be used with other types of cranes, machines or equipment.

DETAILED DESCRIPTION OF THE INVENTION

Figure 1:
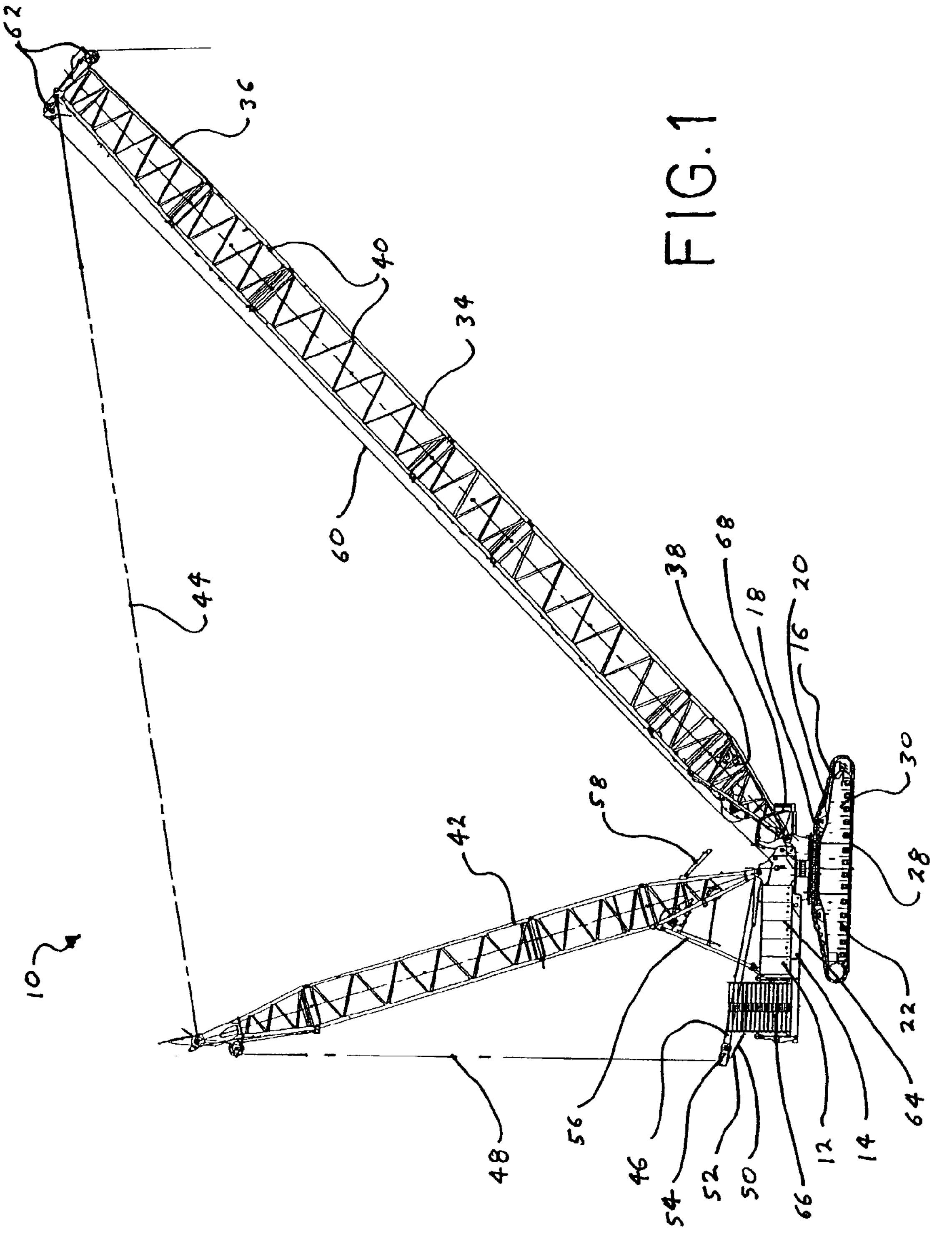
FIG. 1 is a right side elevational view of a complete crawler crane incorporating a plurality of carbody to crawler connections made in accordance with the teachings of this invention.

While the present invention will find application in all types of cranes or construction machines, the preferred embodiment of the invention is described in conjunction with the crawler crane 10 of FIG. 1. The crawler crane 10 includes an upper works 12 having a rotating bed 14 that is rotatably connected to a lower works 16 by a swing bearing 18.

Figure 2:
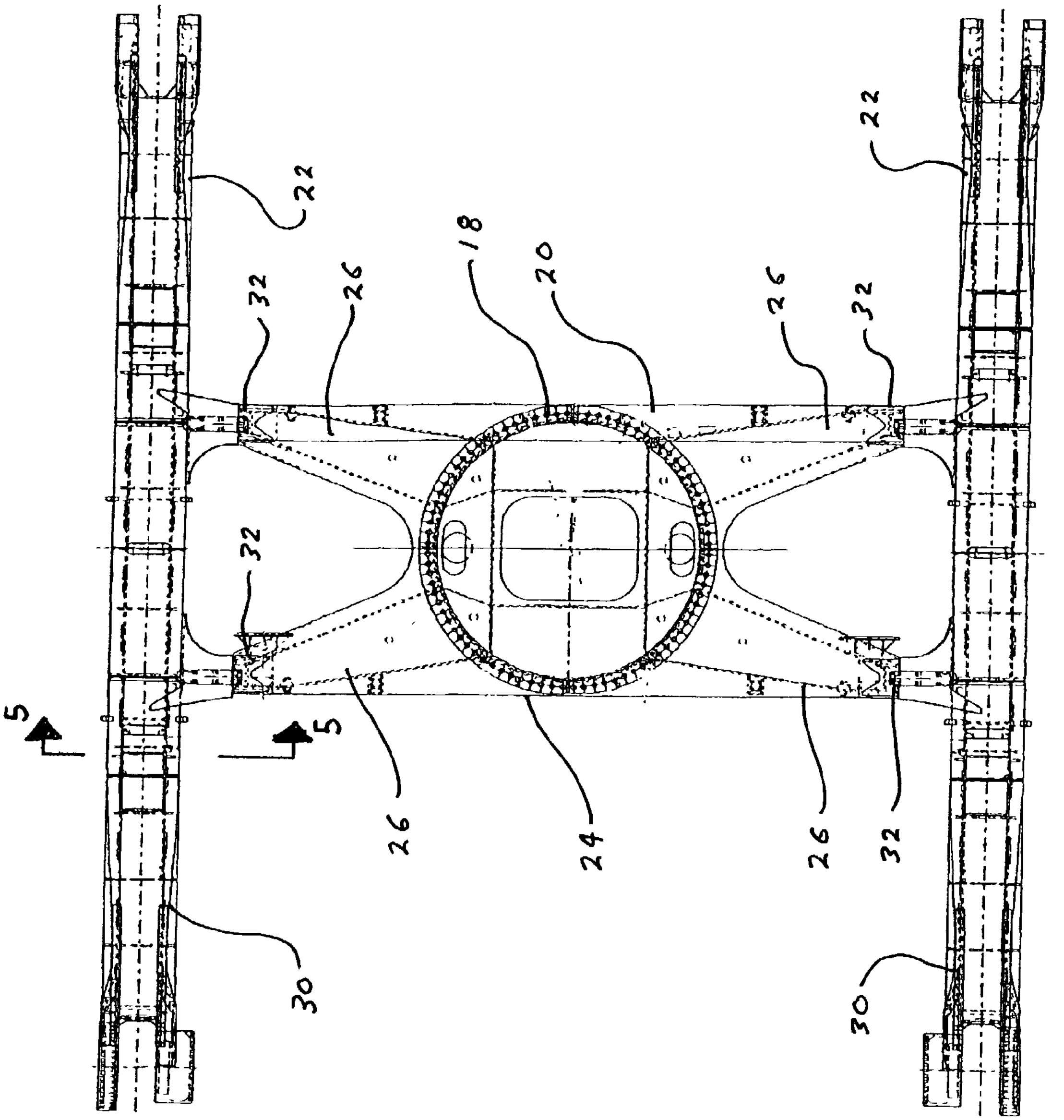
FIG. 2 is a top view of a portion of the lower works of the crawler crane of FIG. 1 showing the locations of the carbody to crawler connections made in accordance with the teachings of this invention.

As best seen in FIG. 2, the lower works 16 includes a carbody 20 and two independently powered crawlers 22. The carbody 20 is H-shaped and includes a central portion 24 with four carbody arms 26 extending outwardly from the right and left sides thereof (see FIG. 3). The crawlers 22 each comprise a crawler track 28 supported by a crawler frame assembly 30 (see FIG. 4). Hydraulic drive equipment (not shown) is mounted on either the carbody 20 or the crawler frame assemblies and supplies power to move crawler tracks 28 so as to move the crane 10. As will be explained in greater detail below, each of the crawler frame assemblies 30 are removably connected to the carbody 20 by a pair carbody to crawler connections 32.

As best seen in FIG. 1, the upper works 12 includes a boom 34 pivotally connected to the upper works 12. The boom 34 comprises a boom top 36 and a tapered boom butt 38. The boom 34 may also include one or more boom inserts 40 connected between the boom top 36 and the boom butt 38 to increase the overall length of the boom 34.

A mast 42 is pivotally connected to the upper works 12. The boom 34 is connected to the mast 42 by one or more boom pendants 44. A gantry 46 is likewise pivotally connected to the upper works 12. The mast 42 is connected to the gantry 46 by one or more mast pendants 48.

The angle of the boom 34 is controlled by boom hoist rigging 50 connected between the upper works 12 and the gantry 46. The boom hoist rigging 50 comprises a boom hoist rope 52 that passes (i.e., is reeved) around a sheave assembly 54 on the upper end of the gantry 46 and a sheave assembly (not shown) on the rearward portion of the upper works 12. One end of the boom hoist rope 52 is typically anchored to the upper works 12, while the other end is anchored to and wrapped around the boom hoist drum (not shown) on the upper works 12.

The gantry 46 supports the connection between the boom hoist rigging 50 and the mast pendants 48 at a location that is distanced from the axis of the mast 42 to optimize the forces in the mast pendants 48 and the boom hoist rigging 50. Likewise, the mast 42 supports the connection between the mast pendants 48 and the boom pendants 44 at a location that is distanced from the axis of the boom 34 to optimize the forces in the boom pendants 44 and the mast pendants 48. Moreover, this arrangement permits the boom hoist rigging 50 to impart a force having a vector component that is perpendicular to the axis of the boom 34. This force is transferred to the end of the boom 34 by the mast pendants 48 and the boom pendants 44. as long As long as the boom 34 is within the normal operating range of the crane 10, the boom hoist rope 52, the mast pendants 48, and the boom pendants 44 are always in tension because the weight of the boom 34 is significantly greater than the combined weight of the mast 42, the gantry 46, and the boom hoist rigging 50. Conversely, the mast 42 and the gantry 46 are always in compression as long as the boom 34 is within the normal operating range of the crane 10. A mast backstop 56 and a boom backstop 58 are each provided to prevent the boom 34 from exceeding a safe operating angle (see FIG. 1).

Rotation of the boom hoist drum in one direction (e.g., clockwise) will retract the boom hoist rope 52, thereby shortening the length of the boom hoist rigging 50 and causing the upper end of the gantry 46 and the mast 42 to be pulled towards the rearward portion of the upper works 12. This in turn raises the end of the boom 34 (i.e., increases the boom angle). Likewise, rotation of the boom hoist drum in the opposite direction (e.g., counter-clockwise) will pay out the boom hoist rope 52, thereby increasing the length of the boom hoist rigging 50 and allowing the upper end of the gantry 46 and the mast 42 to be pulled away from rearward portion of the upper works 12 by the weight of the boom 34. This action results in the lowering of the end of the boom 34 (i.e., decreases the boom angle).

The upper works 12 further includes one or more load hoist lines 60 for lifting loads. Each load hoist line 60 is passed (i.e., reeved) around a load hoist line drum (not shown) supported on the rotating bed 14 of the upper works 12. The load hoist line drums are rotated to either pay out or retrieve the load hoist lines 60. The load hoist lines 60 are reeved around a plurality of boom top sheaves 62 located at the upper end of the boom top 36. The boom 34 may also include one or more wire rope guides attached to upper face of the boom 34 to prevent the load hoist lines 60 from interfering with the lattice structure of the boom 34. A hook block (not shown) is typically attached to each load hoist line 60.

The upper works 12 further includes a power plant 64, such as a diesel engine, and a counterweight assembly 66. The power plant 64 supplies power for the various mechanical and hydraulic operations of the crane 10, including movement of the crawlers 22, rotation of the rotating bed 14, rotation of the load hoist line drums, and rotation of the boom hoist drum. Operation of the various functions of the crane 10 is controlled from the operator's cab 68.

Figure 5:
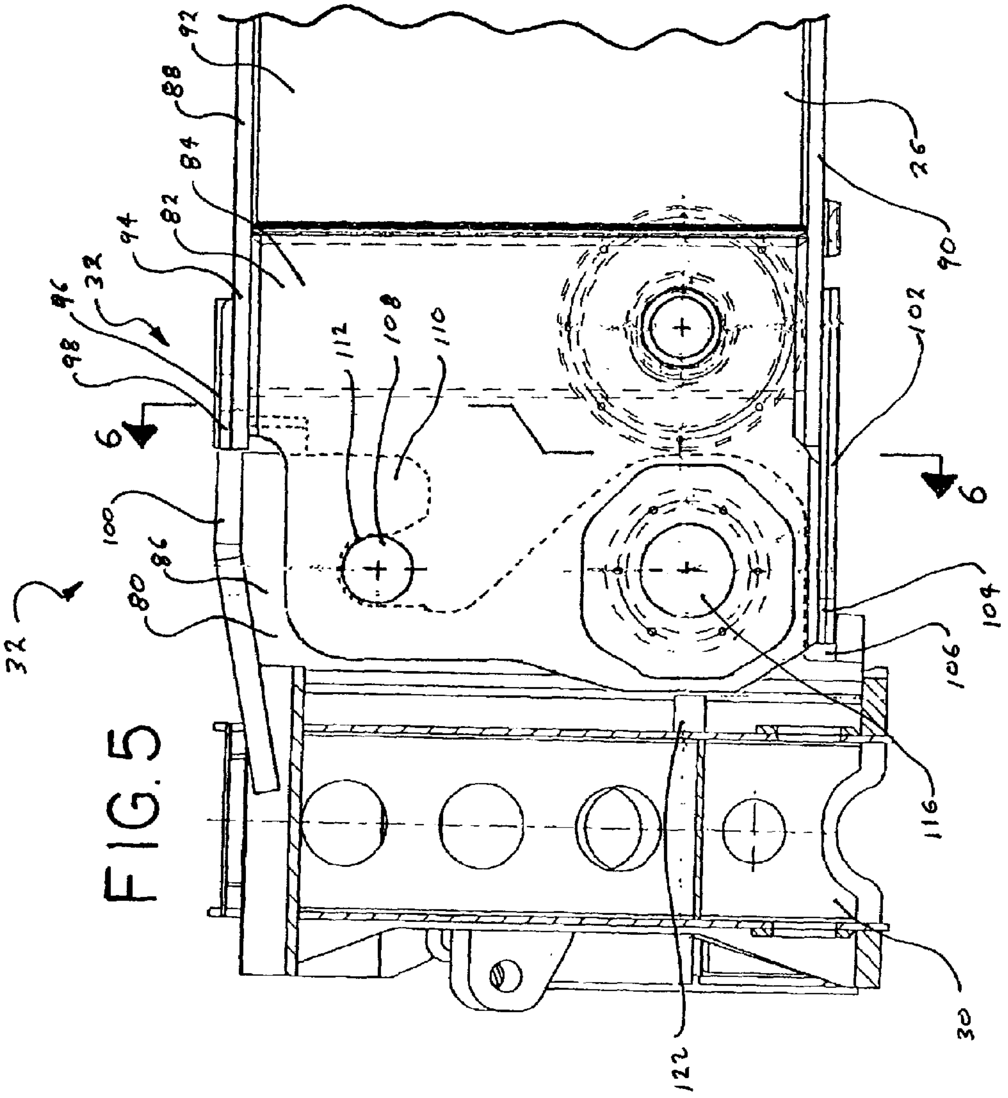
FIG. 5 is a partial rear elevational view of the carbody to crawler connection taken along line 5—5 in FIG. 2 showing the crawler frame assembly connected to the carbody.

As explained briefly above, each of the crawler frame assemblies 30 are removably connected to the carbody 20 by a pair carbody to crawler connections 32. As best seen in FIG. 5, each carbody to crawler connection 32 comprises a crawler connection weldment 80 that is affixed to the crawler frame assembly 30, and a carbody connection weldment 82 that is either affixed to or formed on a portion of the end of the carbody arm 26.

The carbody connection weldment 82 comprises a pair of vertical flanges 84. As will be explained in greater detail below, the vertical flanges 84 are spaced apart from each other so as to accommodate the vertical flange 86 of the crawler connection weldment 80 therebetween (see FIG. 6). In the embodiment shown, each carbody arm 26 has a box-like plate structure comprising a top plate 88, a bottom plate 90, and a pair of vertical plate members 92 welded together. As best seen in FIG. 5, the ends of the vertical plate members 92 of the carbody arm 26 are extended so as to form the vertical flanges 84 of the carbody connection weldment 82. However, it should be appreciated that the vertical flanges 84 of the carbody connection weldment 82 could comprise separate plate members that are welded or bolted to the ends of the vertical plate members 92 of the carbody arm 26.

The carbody connection weldment 82 further comprises a top flange 94 that is formed from an end portion of the top plate 88 of the carbody arm 26. In the embodiment shown, the top flange 94 is reinforced by one or more plate members (see FIG. 5) that have been welded to the top plate 88 of the carbody arm 26 so as to provide additional strength to the carbody connection weldment 82.

Figure 7:
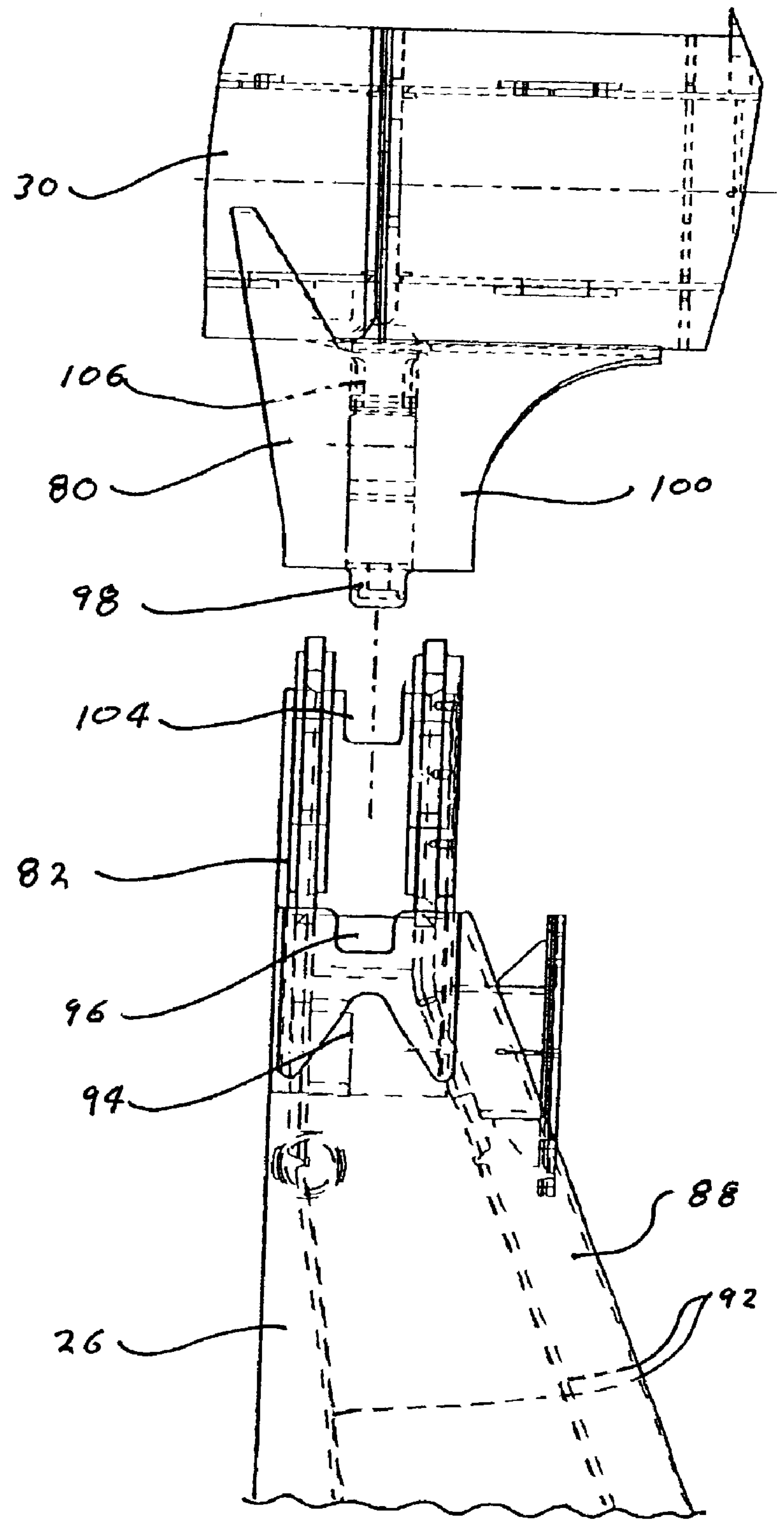
FIG. 7 is a partial top view of the carbody to crawler connection showing the crawler frame assembly disconnected and spaced away from the carbody.

As best seen in FIG. 7, the top flange 94 of the carbody connection weldment 82 further comprises an upper keyway 96. The upper keyway 96 is configured to engage an upper key 98 on the crawler connection weldment 80. As will be explained in greater detail below, the upper keyway 96, in combination with the upper key 98, is configured so as to maintain alignment between the top portion of the carbody connection weldment 82 and the top portion of the crawler connection weldment 80. The upper keyway 96, in combination with the upper key 98, is also configured so as to transfer lateral or transverse loads between the top portion of the carbody connection weldment 82 and the top portion of the crawler connection weldment 80.

In the embodiment shown, and as best seen in FIG. 7, the upper keyway 96 is formed by removing a rectangular portion from the top flange 94 of the carbody connection weldment 82 (and any reinforcing plates added thereto) so as to form a female receiving portion. Similarly, the upper key 98 is formed by extending a rectangular portion of the top flange 100 and a upper portion of the vertical flange 86 of the crawler connection weldment 80 (and any reinforcing plates added thereto) so as to form a male engaging portion. Of course, it should be appreciated that the upper keyway 96 and the upper key 98 could comprise any number of shapes or configurations that will adequately transfer any lateral loads and maintain the alignment between the top portion of the carbody connection weldment 82 and the top portion of the crawler connection weldment 80.

The carbody connection weldment 82 further comprises a bottom flange 102 that is affixed to an end portion of the bottom plate 90 of the carbody arm 26. In the embodiment shown, the bottom flange 102 is formed by welding a steel plate member (see FIG. 5) to the bottom plate 90 of the carbody arm 26.

Figure 8:
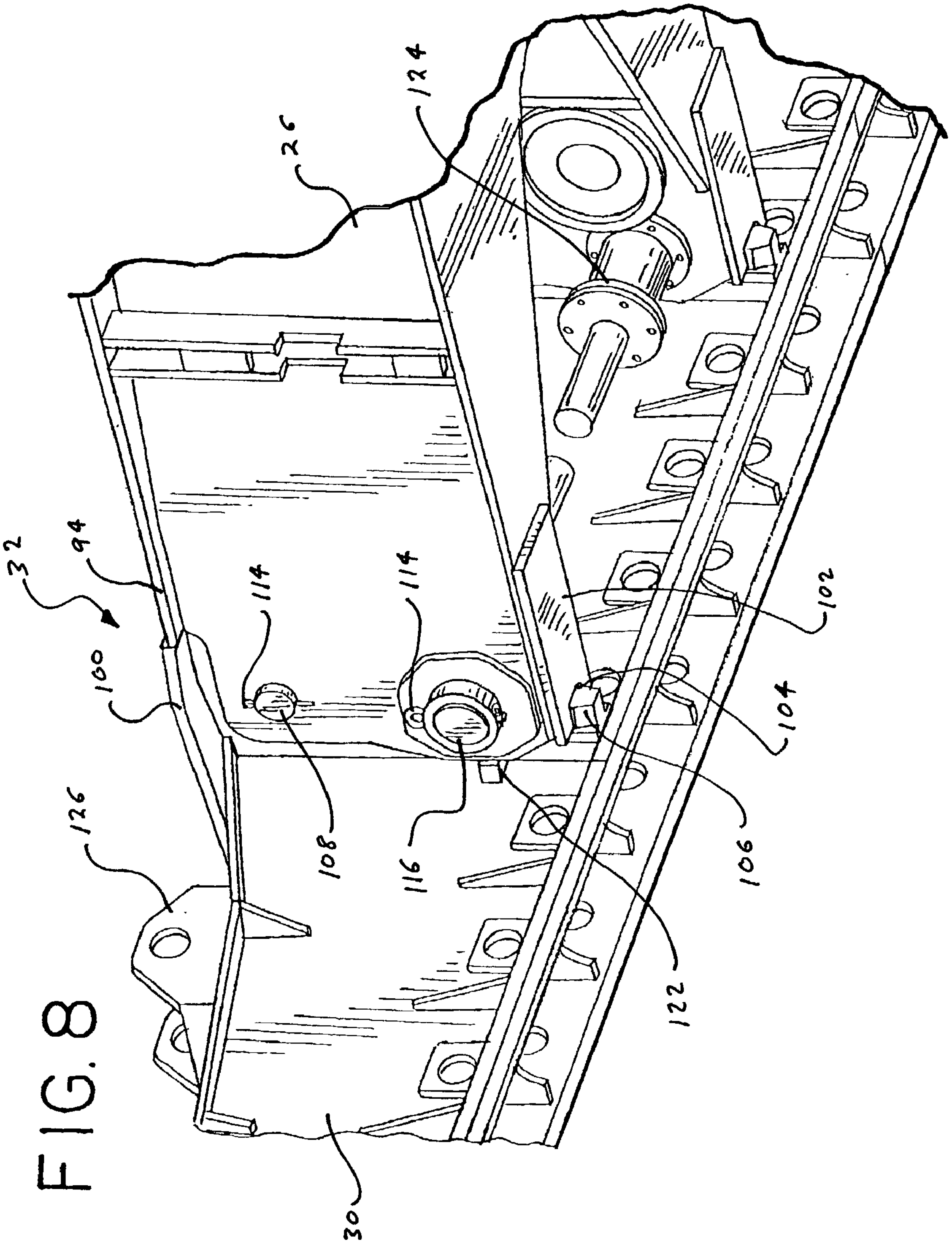
FIG. 8 is bottom perspective view of the carbody to crawler connection showing the crawler frame assembly connected to the carbody.

As best seen in FIGS. 7 and 8, the bottom flange 102 of the carbody connection weldment 82 further comprises a lower keyway 104. The lower keyway 104 is configured to engage a lower key 106 on the crawler connection weldment 80. As will be explained in greater detail below, the lower keyway 104, in combination with the lower key 106, is configured so as to maintain alignment between the bottom portion of the carbody connection weldment 82 and the bottom portion of the crawler connection weldment 80. The lower keyway 104, in combination with the lower key 106, is also configured so as to transfer lateral or transverse loads between the bottom portion of the carbody connection weldment 82 and the bottom portion of the crawler connection weldment 80.

In the embodiment shown, and as best seen in FIGS. 7 and 8, the lower keyway 104 is formed by removing a rectangular portion from the bottom flange 102 of the carbody connection weldment 82 so as to form a female receiving portion. The lower key 106 is formed by a lower portion of the vertical flange 86 of the crawler connection weldment 80 (see FIG. 5) so as to form a male engaging portion. Of course, it should be appreciated that the lower keyway 104 and the lower key 106 could comprise any number of shapes or configurations that will adequately transfer any lateral loads and maintain the alignment between the bottom portion of the carbody connection weldment 82 and the bottom portion of the crawler connection weldment 80.

The carbody connection weldment 82 further comprises a fixed pin 108 that extends through both of the vertical flanges 84 of the carbody connection weldment 26. As will be explained in greater detail below, the fixed pin 108 is configured to engage a hook 110 formed on the upper portion of the vertical flange 86 of the crawler connection weldment 80. In the embodiment shown, and as best seen in FIG. 8, the fixed pin 108 comprises a steel cylinder that extends through a circular hole 112 in each of the vertical flanges 84 of the carbody connection weldment 82 (see FIG. 5). The fixed pin 108 is held in position by a retaining pin 114 that extends through each end thereof.

The carbody connection weldment 82 further comprises a hydraulically actuated locking pin 116 that is configured to extend through both of the vertical flanges 84 of the carbody connection weldment 82. As will be explained in greater detail below, the hydraulically actuated locking pin 116 is configured to engage a circular hole 118 formed in the lower portion of the vertical flange 86 of the crawler connection weldment 80. In the embodiment shown, and as best seen in FIG. 8, the locking pin 116 comprises a steel cylinder that is through a circular hole 120 in lower portion of each of the vertical flanges 84 of the carbody connection weldment 82 and the circular hole 118 (see FIG. 5) and formed in the lower portion of the vertical flange 86 of the crawler connection weldment 80 by a hydraulic actuating mechanism 124 (see FIG. 8). The locking pin 116 is further held in position by a retaining pin 114 that extends through an end thereof.

Figure 6:
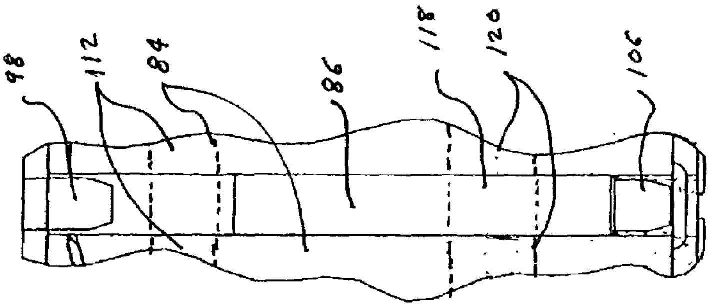
FIG. 6 is a sectional view of the carbody to crawler connection taken along line 6—6 in FIG. 5.

As best seen in FIG. 5, the crawler connection weldment 80 comprises a vertical flange 86 and a top flange 100, each of which are welded to the interior surface of the crawler frame assembly 30. As discussed above, the vertical flange 86 of the crawler connection weldment 80 is configured so as to be disposed between the pair of vertical flanges 84 of the carbody connection weldment 82. In the embodiment shown, and as best seen in FIG. 6, the thickness of the vertical flange 86 of the crawler connection weldment 80 is slightly smaller than the distance between the pair of vertical flanges 84 of the carbody connection weldment 82 so as to insure a snug fit between these components. In the alternative, the distance between the pair of vertical flanges 84 of the carbody connection weldment 82 could be increased to make it easier to position and connect the crawler connection weldment 80 with the carbody connection weldment 82 when assembling the crawlers 22 to the carbody 20.

The vertical flange 86 of the crawler connection weldment 80 comprises a hook 110 that is configured to hang onto or otherwise engage the fixed pin 108 in the carbody connection weldment 82. As discussed above, the hook 110 serves as guide for aligning the crawler connection weldment 80 with the carbody connection weldment 82 when assembling the crawlers 22 to the carbody 20. In other words, when assembling the crawlers 22 to the carbody 20, the crawlers 22 are lowered onto the carbody 20 until the hook 110 rests on the fixed pin 108. The hook 110 temporarily supports the weight of the crawlers 22 until the carbody to crawler connection 32 is secured. The hook 110 also helps to align the components of the crawler connection weldment 80 with the components of the carbody connection weldment 82. Once the carbody to crawler connection 32 is secured, then the hook 110 functions to prevent the top of the crawler frame assembly 30 from moving away from the top of the carbody arms 26.

The vertical flange 86 of the crawler connection weldment 80 further comprises a cylindrical hole 118 disposed through a lower portion thereof (see FIG. 5). As discussed above, the hole 118 is configured so as to be engaged by the hydraulically actuated locking pin 116 attached to the carbody connection weldment 82. In particular, the carbody to crawler connection 32 is secured by extending the locking pin 116 through the circular hole 118 of the vertical flange 86 of the crawler connection weldment 80 and the circular hole 120 in each of the vertical flanges 84 of the carbody connection weldment 82. Once this connection is secured, the weight of the carbody 26, the upper works 12, and any loads being supported by the crane 10 is transferred from the vertical flanges 84 of the carbody connection weldment 82 to the vertical flange 86 of the crawler connection weldment 80 via locking pin 116. The connection formed by the locking pin 116 also prevents the lower portion of the crawler frame assembly 30 from moving away from the bottom of the carbody arms 26.

As best seen in FIG. 5, an abutment block 122 is affixed to the interior surface of the crawler frame assembly 30 on either side of the vertical flange 86 of the crawler connection weldment. The abutment blocks 122 are configured to contact the flanges 84 of the carbody connection weldment 82 when the hook 110 rests on the fixed pin 108 and the circular holes 118 and 120 in vertical flanges 86 and 84, respectively, are aligned so as to facilitate the engagement of the locking pin 116.

The vertical flange 86 of the crawler connection weldment 80 further comprises a lower key 106 that is formed on a lower portion thereof (see FIGS. 7 and 8). As discussed above, the lower key 106 is configured to engage the lower keyway 104 formed in the bottom flange 102 of the carbody connection weldment 82. When the carbody to crawler connection 32 is secured (i.e., when the locking pin 116 is extended through the circular holes 118 and 120 in vertical flanges 86 and 84, respectively), the lower key 106 of the crawler connection weldment 80 is closely mated with the lower keyway 104 of the carbody connection weldment 82. This keyed or mated arrangement prevents the bottom flange 102 of the carbody connection weldment 82, and in turn the bottom of the carbody arm 26, from deflecting or moving laterally away from the bottom portion of the crawler connection weldment 80. This keyed or mated arrangement also transfers lateral or transverse loads between the bottom portion of the carbody connection weldment 82 and the bottom portion of the crawler connection weldment 80. In other words, the lower key 106 and the lower keyway 104 prevent any eccentric loading conditions, forces or deflections in the carbody 26 from causing misalignment between the carbody connection weldment 82 and the crawler connection weldment 80.

The top flange 100 of the crawler connection weldment 80 further comprises an upper key 98 that is formed along a central portion thereof (see FIG. 7). As discussed above, the upper key 98 is configured to engage the upper keyway 96 formed in the top flange 94 of the carbody connection weldment 82. When the carbody to crawler connection 32 is secured (i.e., when the locking pin 116 is extended through the circular holes 118 and 120 in vertical flanges 86 and 84, respectively), the upper key 98 of the crawler connection weldment 80 is closely mated with the upper keyway 96 of the carbody connection weldment 82. This keyed or mated arrangement prevents the top flange 94 of the carbody connection weldment 82, and in turn the top of the carbody arm 26, from deflecting or moving laterally away from the top of the crawler connection weldment 80. This keyed or mated arrangement also transfers lateral or transverse loads between the top portion of the carbody connection weldment 82 and the top portion of the crawler connection weldment 80. In other words, the upper key 98 and the upper keyway 96 prevent any eccentric loading conditions, forces or deflections in the carbody 26 from causing misalignment between the carbody connection weldment 82 and the crawler connection weldment 80.

The keyed or mated arrangement between the top flange 94 of the carbody connection weldment 82 and the top flange 100 of the crawler connection weldment 80 is also important because top flanges 94 and 100 butt against each other so as to transfer compressive forces between the top portion of the crawler connection weldment 80 and the top portion of the carbody connection weldment 82 during normal crane operations. Thus, any misalignment between top flanges 94 and 100 may result in failure of the carbody to crawler connection 32.

Figure 3:
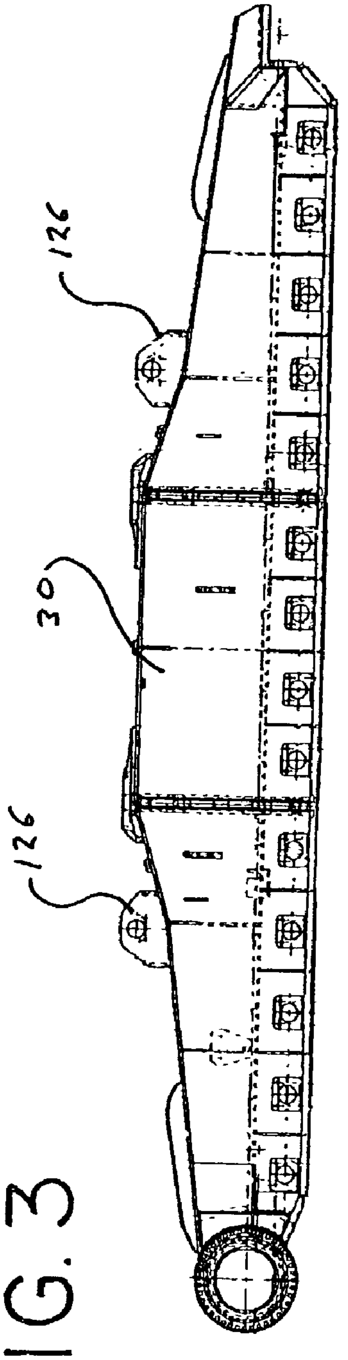
FIG. 3 is a right side elevational view of the crawler frame assembly.
Figure 4:
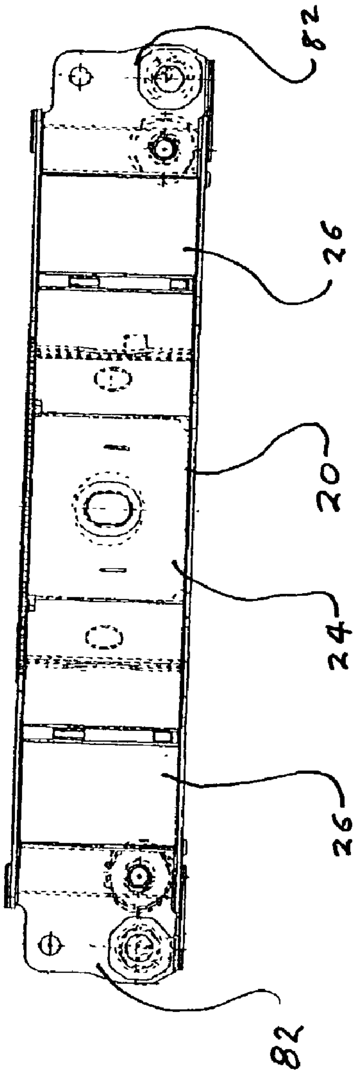
FIG. 4 is a rear elevational view of the carbody.

The crawlers 22 are assembled onto the carbody 26 by using an assist crane (not shown) to hook onto a pair of lifting blocks 126 affixed to the top of the crawler frame assembly 30 (see FIGS. 3 and 8). As best seen in FIG. 7, the assist crane is then used to maneuver the crawler 22 so as to align the vertical flange 86 of each the pair of crawler connection weldments 80 in between the pair of vertical flanges 84 of each of the respective carbody connection weldments 82. The crawler 22 is then moved towards the carbody 26 until the hooks 110 of crawler connection weldments 80 are each disposed above the fixed pins 108 of each of the respective carbody connection weldments 82. As best seen in FIG. 5, the crawler 22 is then lowered until the each of the hooks 110 engage each of the fixed pins 108, and the vertical flanges 84 of the each of the carbody connection weldments 82 rest against the abutment blocks 122 on the crawler frame assembly 30. As best seen in FIGS. 5 and 6, the upper key 98 and the lower key 106 of each of the crawler connection weldments 80 will likewise be aligned with the upper keyway 96 and the lower keyway 104, respectively, of each of the carbody connection weldments 82. As best seen in FIG. 8, the hydraulic actuating mechanism 124 is then actuated so as to extend the locking pin 116 on each of the carbody connection weldments 82 through the respective crawler connection weldments 80 so as to secure each of the carbody to crawler connections 32. The retaining pin 114 is placed through the end of each of the locking pins 116 to prevent accidental retraction of the locking pins 116.

It should be appreciated that the apparatus and methods of the present invention are capable of being incorporated in the form of a variety of embodiments, only a few of which have been illustrated and described above. The invention may be embodied in other forms without departing from its spirit or essential characteristics. For example, the present invention could be incorporated in other types of vehicles utilizing removable crawler assemblies. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A crawler vehicle having a lower works comprising a carbody and a pair of crawler assemblies, said crawler assemblies each being removably connected to said carbody by a plurality of spaced apart carbody to crawler connections disposed along an axis of the crawler assembly, each of said carbody to crawler connections comprising:

a carbody connection weldment affixed to an arm portion of said carbody, said carbody connection weldment including a horizontally disposed top flange member and a vertical flange member, said vertical flange member being disposed along a plane that intersects the axis of the crawler assembly; and a crawler connection weldment affixed to a crawler frame of said crawler assembly, said crawler connection weldment including a horizontally disposed top flange member and a vertical flange member, said vertical flange member being disposed along a plane that intersects the axis of the crawler assembly, wherein the top flange member of said carbody connection weldment and the top flange member of said crawler connection weldment are configured to abut against each other when said crawler is assembled to said carbody, wherein one of said carbody connection weldment and said crawler connection weldment comprises a pair of vertical flanges disposed along a pair of spaced apart parallel planes that intersect the axis of the crawler assembly, and the vertical flange of the other of said carbody connection weldment and said crawler connection weldment is disposed between the pair of vertical flanges when said crawler is assembled to said carbody, wherein one of said carbody connection weldment and said crawler connection weldment includes a keyway, and the other of said carbody connection weldment and said crawler connection weldment includes a key, said key being configured to engage said keyway so as to prevent misalignment between said carbody connection weldment and said crawler connection weldment, and further wherein said key and said keyway are disposed in the top flange members of said carbody connection weldment and said crawler connection weldment.

2. The crawler vehicle according to claim 1 wherein one of said carbody connection weldment and said crawler connection weldment includes a second keyway, and the other of said carbody connection weldment and said crawler connection weldment includes a second key, said second key and said second keyway being disposed adjacent a bottom portion of said carbody to crawler connection.

3. The crawler vehicle according to claim 1 wherein a bottom flange member is connected between the pair of vertical flange members of the one of said carbody connection weldment and said crawler connection weldment, said bottom flange member being configured to engage the vertical flange of the other of said carbody connection weldment and said crawler connection weldment.

4. The crawler vehicle according to claim 1 wherein a horizontal pin is disposed through each of the vertical flange members.

5. The crawler vehicle according to claim 1 wherein a plurality of horizontal pins are disposed through each of the vertical flange members, at least one of said pins being removable so as to permit said crawler connection weldment to be disconnected from said carbody connection weldment.

6. The crawler vehicle according to claim 5 wherein said removable pin is actuated by a hydraulic mechanism affixed to one of the carbody and the pair of crawler assemblies.

7. The crawler vehicle according to claim 1 wherein a pin extends between the pair of vertical flange members of the one of said carbody connection weldment and said crawler connection weldment, and the vertical flange of the other of said carbody connection weldment and said crawler connection weldment comprises a hook that is configured to engage to pin.

8. The crawler vehicle according to claim 1 wherein said key comprises a rectangular male engagement member extending horizontally from an end of one of said top flange members, and wherein said keyway comprises a rectangular female engagement member formed in an end of the other of said top flange members.

9. The crawler vehicle according to claim 1 wherein said crawler vehicle is a crane having an upper works rotatably mounted on said lower works, and further wherein a boom is pivotally mounted on the upper works.

10. A crawler crane having an upper works rotatably mounted on a lower works and a boom pivotally mounted on the upper works, said lower works comprising a carbody and a pair of crawler assemblies, each of said crawler assemblies being removably connected to said carbody by a plurality of carbody to crawler connections disposed at spaced apart locations along an axis of the crawler assembly, each of said carbody to crawler connections comprising:

a carbody connection member affixed to an arm portion of said carbody, said carbody connection member comprising a horizontal top flange, a horizontal bottom flange, and a pair of spaced apart vertical flanges connected between said top and bottom flanges, each of said pair of vertical flanges being disposed along a plane that intersects the axis of the crawler assembly; and a crawler connection member affixed to a crawler frame of said crawler assembly, said crawler connection member comprising a horizontal top flange and a vertical flange, said vertical flange being disposed along a plane that intersects the axis of the crawler assembly, wherein the vertical flange of said crawler connection member is disposed in between the pair of vertical flanges of said carbody connection member, wherein at least one pin is disposed through the vertical flange of said crawler connection member and the pair of vertical flanges of said carbody connection member, said pin being configured so as to transfer forces between said crawler assemblies and said carbody, and wherein the top flange of one of said carbody connection weldment and said crawler connection weldment includes a keyway, and the top flange of the other of said carbody connection weldment and said crawler connection weldment includes a key, said key being configured to mate with said keyway so as to prevent misalignment between the top flanges of said carbody connection weldment and said crawler connection weldment.

11. The crawler crane according to claim 10 wherein said at least one pin comprises a fixed pin and a removable pin, further wherein said fixed pin extends between an upper portion of the pair of vertical flanges of said carbody connection member, and an upper portion of the vertical flange of said crawler connection member comprises a hook portion that is configured to engage said fixed pin, and further wherein said removable pin extends through a lower portion of the vertical flange of said crawler connection member and a lower portion of each of the pair of vertical flanges of said carbody connection member.

12. The crawler crane according to claim 11 wherein said removable pin is actuated by a hydraulic mechanism affixed to one of the carbody and the pair of crawler assemblies.

13. The crawler crane according to claim 10 wherein said carbody connection member comprises a rectangular female engagement member formed in an end of the of the bottom flange that is configured to mate with the vertical flange of said crawler connection weldment so as to prevent misalignment between the bottom flange of said carbody connection member and the lower portion of said crawler connection member.

14. The crawler crane according to claim 10 wherein said key comprises a rectangular male engagement member extending horizontally from an end of one of said top flange members, and wherein said keyway comprises a rectangular female engagement member formed in an end of the other of said top flange members.

* * * * *